(12) United States Patent
Sutardja

(10) Patent No.: US 8,514,508 B1
(45) Date of Patent: Aug. 20, 2013

(54) PREAMP CIRCUIT INCLUDING A LOOPBACK MODE FOR DATA STORAGE DEVICES

(71) Applicant: Marvell International Ltd., Hamilton (BM)

(72) Inventor: Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/767,176

(22) Filed: Feb. 14, 2013

Related U.S. Application Data (60) Continuation of application No. 13/323,764, filed on Dec. 12, 2011, now Pat. No. 8,379,341, which is a division of application No. 12/966,099, filed on Dec. 13, 2010, now Pat. No. 8,077,415, which is a division of application No. 12/341,021, filed on Dec. 22, 2008, now Pat. No. 7,852,585, which is a division of application No. 10/722,079, filed on Nov. 25, 2003, now Pat. No. 7,477,467.

(51) Int. Cl.
*G11B 5/09* (2006.01)

(52) U.S. Cl.
USPC ............................................. 360/46; 360/31

(58) Field of Classification Search
None
See application file for complete search history.

(56) References Cited

U.S. PATENT DOCUMENTS

| | | | |
|---|---|---|---|
| 4,887,171 A | 12/1989 | Rose | |
| 5,530,687 A | 6/1996 | Yamaguchi | |
| 6,304,403 B1 | 10/2001 | Ionescu | |
| 6,397,042 B1 | 5/2002 | Prentice et al. | |
| 6,424,475 B1 | 7/2002 | Bhandari et al. | |
| 6,628,467 B2 | 9/2003 | Cyrusian | |
| 6,657,953 B1 | 12/2003 | Hiramoto et al. | |
| 6,765,736 B2 | 7/2004 | Ko et al. | |

*Primary Examiner* — Jason Olson (57) ABSTRACT

A system including a hard disk control circuit, a read channel circuit, and a preamplifier circuit. The hard disk control circuit is configured to generate a first symbol. The read channel circuit configured to encode the first symbol to generate an encoded symbol. The preamplifier circuit configured to operate in a loopback mode. While operating in the loopback mode, the preamplifier circuit is configured to amplify the encoded symbol and transmit the encoded symbol back to the read channel circuit. The read channel circuit is configured to decode the encoded symbol to generate a second symbol and provide the second symbol to the hard disk control circuit. The hard disk control circuit is configured to perform a comparison between the first symbol and the second symbol and generate an indication of whether the preamplifier circuit is operating properly based on the comparison between the first symbol and the second symbol.

17 Claims, 8 Drawing Sheets

PREAMP CIRCUIT INCLUDING A LOOPBACK MODE FOR DATA STORAGE DEVICES

CROSS-REFERENCE TO RELATED APPLICATIONS

The present disclosure is a continuation of U.S. patent application Ser. No. 13/323,764 (now U.S. Pat. No. 8,379,341), filed on Dec. 12, 2011, which is a divisional of U.S. patent application Ser. No. 12/966,099 (now U.S. Pat. No. 8,077,415), filed Dec. 13, 2010, which is a divisional of U.S. patent application Ser. No. 12/341,021 (now U.S. Pat. No. 7,852,585), filed on Dec. 22, 2008, which is a divisional of U.S. application Ser. No. 10/722,079 (now U.S. Pat. No. 7,477,467), filed Nov. 25, 2003. The entire disclosures of the applications referenced above are incorporated herein by reference.

FIELD

The present invention relates to data storage devices, and more particularly to preamplifiers and read channel circuits in data storage devices.

BACKGROUND

Figure 1:
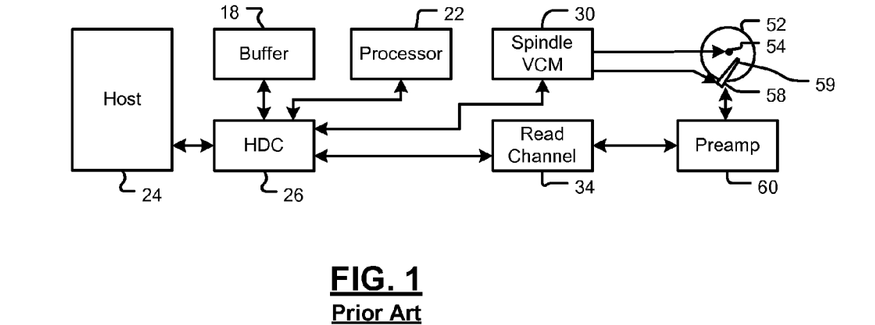
FIG. 1 is a functional block diagram of an exemplary data storage device according to the prior art.

Referring now to FIG. 1, an exemplary data storage device 10 is shown. A buffer 18 stores data that is associated the control of a hard disk drive. The buffer 18 may employ SDRAM or other types of low latency memory. A processor 22 performs processing that is related to the operation of the hard disk drive. A hard disk controller (HDC) 26 communicates with the buffer 18, the processor 22, a host 24, a spindle/voice coil motor (VCM) driver 30, and/or a read/write channel circuit 34.

During a write operation, the read/write channel circuit or read channel circuit 34 encodes the data to be written onto the storage medium. The read/write channel circuit 34 processes the signal for reliability and may include, for example error correction coding (ECC), run length limited coding (RLL), and the like. During read operations, the read/write channel circuit 34 converts an analog output from the medium to a digital signal. The converted signal is then detected and decoded by known techniques to recover the data written on the hard disk drive.

One or more hard drive platters 52 include a magnetic coating that stores magnetic fields. The platters 52 are rotated by a spindle motor that is schematically shown at 54. Generally the spindle motor 54 rotates the hard drive platter 52 at a fixed speed during the read/write operations. One or more read/write arms 58 move relative to the platters 52 to read and/or write data to/from the hard drive platters 52. The spindle/VCM driver 30 controls the spindle motor 54, which rotates the platter 52. The spindle/VCM driver 30 also generates control signals that position the read/write arm 58, for example using a voice coil actuator, a stepper motor or any other suitable actuator.

A read/write device 59 is located near a distal end of the read/write arm 58. The read/write device 59 includes a write element such as an inductor that generates a magnetic field. The read/write device 59 also includes a read element (such as a magneto-resistive (MR) element) that senses the magnetic fields on the platter 52. A preamplifier (preamp) circuit 60 amplifies analog read/write signals. When reading data, the preamp circuit 60 amplifies low level signals from the read element and outputs the amplified signal to the read/write channel circuit 34. While writing data, a write current that flows through the write element of the read/write device 59 is switched to produce a magnetic field having a positive or negative polarity. The positive or negative polarity is stored by the hard drive platter 52 and is used to represent data.

Figure 2:
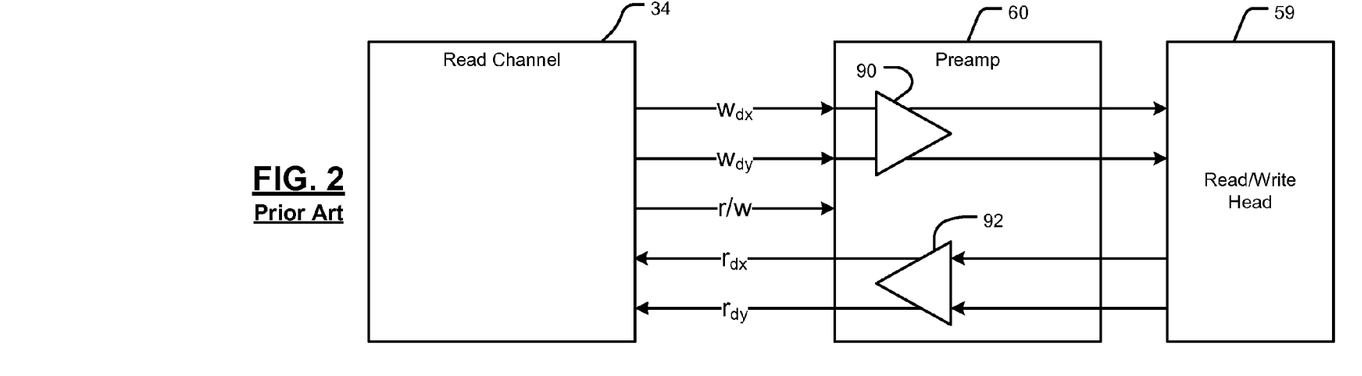
FIG. 2 is a functional block diagram of a read channel circuit and preamp circuit according to the prior art.

Referring now to FIG. 2, the read channel circuit 34 outputs write signals $w_{dx}$ and $w_{dy}$ to the preamp circuit 60 when writing data. The preamp circuit 60 amplifies the write signals using a write amplifier 90. The amplified write signals are output to the read/write device 59. When reading data, the preamp circuit 60 receives signals from the read/write device 59, amplifies the signals using a read amplifier 92 and outputs amplified read signals $r_{dx}$ and $r_{dy}$ to the read channel circuit 34. In current data storage device architectures, there is no way to test whether the preamp circuit 60 is operating properly. Therefore, it is difficult to diagnose malfunctions in the preamp circuit 60.

SUMMARY

In general, in one aspect, this specification describes a data storage device preamplifier circuit including (i) a write amplifier having an input and an output, and (ii) a read amplifier has an input and an output. The data storage device preamplifier circuit further includes a loopback circuit configured to selectively connect the output of the write amplifier to the input of the read amplifier.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

The present invention will become more fully understood from the detailed description and the accompanying drawings, wherein.

DESCRIPTION

The following description of the preferred embodiment(s) is merely exemplary in nature and is in no way intended to limit the invention, its application, or uses. For purposes of clarity, the same reference numbers will be used in the drawings to identify similar elements.

Figure 3A:
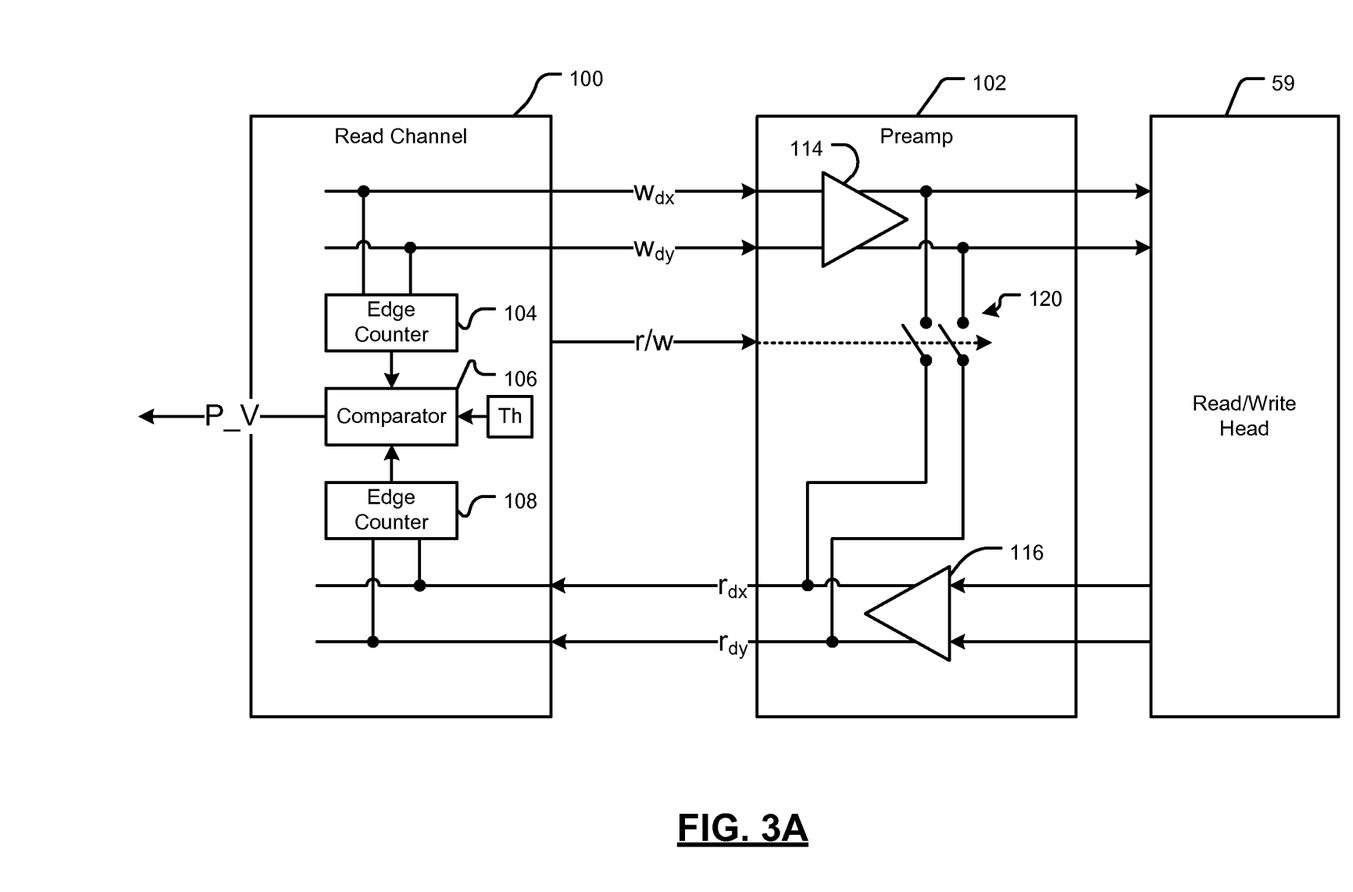
FIG. 3A is a functional block diagram of a first exemplary read channel circuit and a preamp circuit with switched loopback according to the present invention.

Referring now to FIG. 3A, a functional block diagram of a read channel circuit 100 and a preamp circuit 102 according to the present invention is shown. The read channel circuit 100 includes a first counter 104 that counts an attribute of the write signal $w_{dx}$ and $w_{dy}$. An output of the first counter 104 is input to a comparator 106, which has a threshold Th. A second counter 108 counts the selected attribute of the read signal $r_{dx}$ and $r_{dy}$ that is received from the preamp circuit 102. For example, the counters 104 and 108 can count a rising edge, a falling edge, a pulse and/or any other attribute of the write signal and the looped-back write signal. The counted attributes allow a comparison to be made between the write signal and the looped-back write signal, which indicates the operability of the preamp circuit 102.

The preamp circuit 102 includes a write amplifier 114 that is located in the write path. The write amplifier 114 amplifies the write signal $w_{dx}$ and $w_{dy}$ and outputs the amplified write signal to the read/write device 59. The preamp circuit 102 also includes a read amplifier 116 that receives read signals from the read/write device 59, amplifies the read signals to generate the read signals $r_{dx}$ and $r_{dy}$, and outputs the amplified read signals to the read channel circuit 100.

The preamp circuit 102 provides a loopback mode during which the write amplifier 114 of the preamp circuit 102 is tested. In FIG. 3A, a switch 120 connects an output of the write amplifier 114 to an output of the read amplifier 116. When the switch 120 is used, the read amplifier 116 is optionally turned off during the loopback mode to reduce noise in the system due to signals from the read/write head 59. Turning off the read amplifier 116 may be accomplished by turning off or disconnecting a supply voltage, disconnecting the input of the read amplifier 116 from the read/write head and/or grounding the inputs of the read amplifier 116.

Figure 3B:
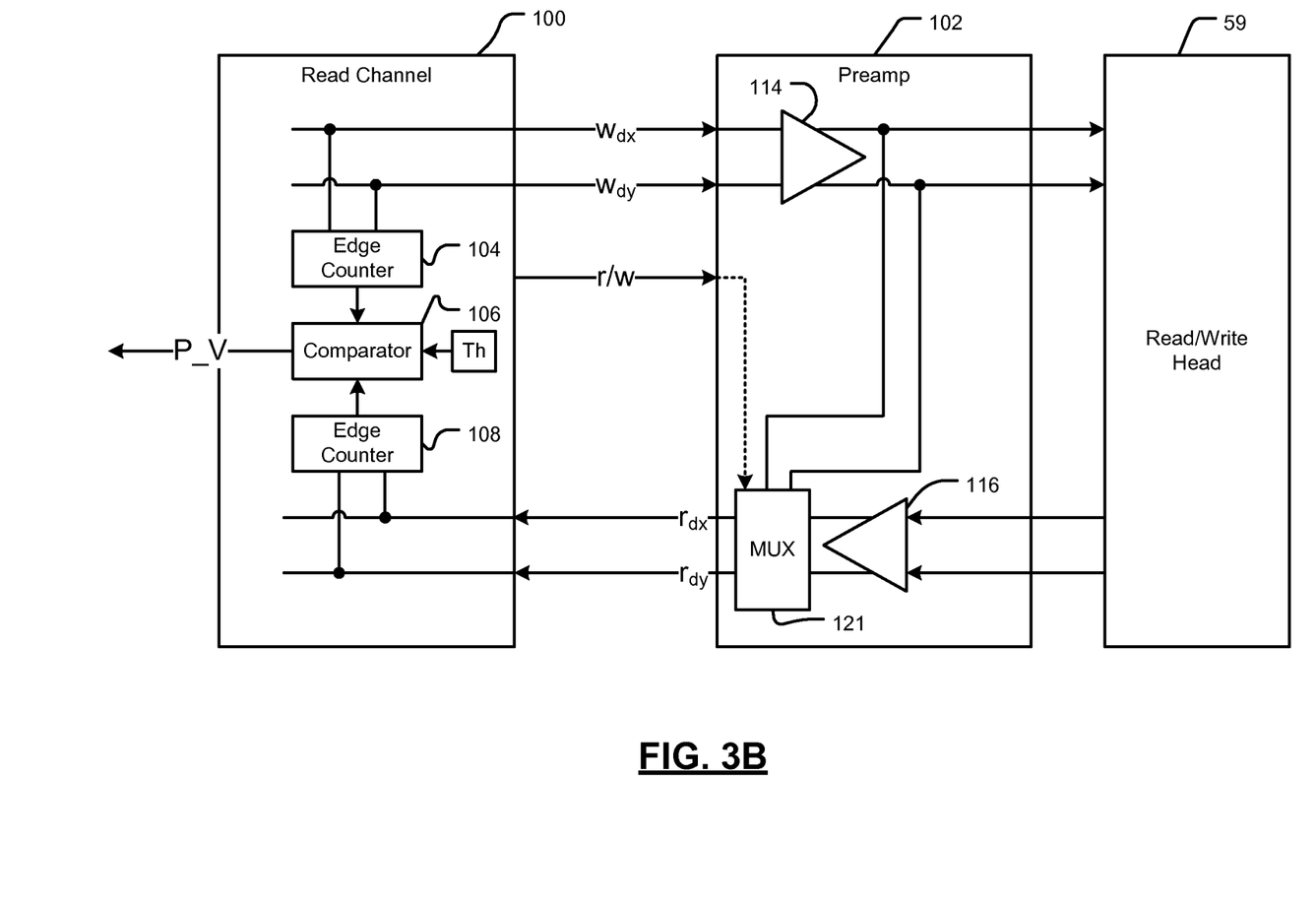
FIG. 3B is a functional block diagram of a first exemplary read channel circuit and a preamp circuit with multiplexed loopback according to the present invention.

As can be appreciated, other devices such as a multiplexer can be used by the loopback circuit. Referring now to FIG. 3B, a multiplexer 121 is used to connect the output of the write amplifier 114 to the read channel 100. The multiplexer 121 also disconnects the output of the write amplifier 116 at the same time, which reduces noise.

Referring now to FIGS. 3A and 3B, a write enable signal (W) is generated by the read channel circuit 100 during a write operation. In one embodiment, the write enable signal controls the switch 120 or the multiplexer 121. The output of the write amplifier 114 is looped back by the switch 120 or the multiplexer 121 to the read channel circuit 100. In other words, the switch 120 or the multiplexer 121 connects the output of the write amplifier 114 to the read signal input of the read channel 100. When the write enable signal is not asserted (e.g. during a read operation), the output of the write amplifier 114 is not looped back by the switch 120 or the multiplexer 121 to the read channel circuit 100.

The first counter 104 generates a first count of the selected attribute of the write signal. The first count is output to the comparator 106. The second counter 108 receives the amplified write signal that is looped back through the write amplifier 114. The second counter 108 generates a second count of the attribute for the looped-back write signal. The second count is output to the comparator 106. The comparator 106 compares a difference between the first and second counts to a threshold (Th).

If the difference between the first and second counts are less than or equal to the threshold, the comparator 106 outputs a first state. If the difference between the first and second counts are not less than or equal to the threshold, the comparator 106 outputs a second state. The first state corresponds to an operational preamplifier circuit. The second state corresponds to a non-operational preamplifier circuit. Faults and/or flags can optionally be generated when the comparator outputs the second state. As can be appreciated, testing of the preamp circuit 102 can be performed when the write enable signal is present. In addition, the testing can be performed at other intervals. For example, testing can be performed when the write enable signal is present during startup, periodically, randomly, during all write operations, in response to a particular event or events, or in any other suitable manner.

Figure 4:
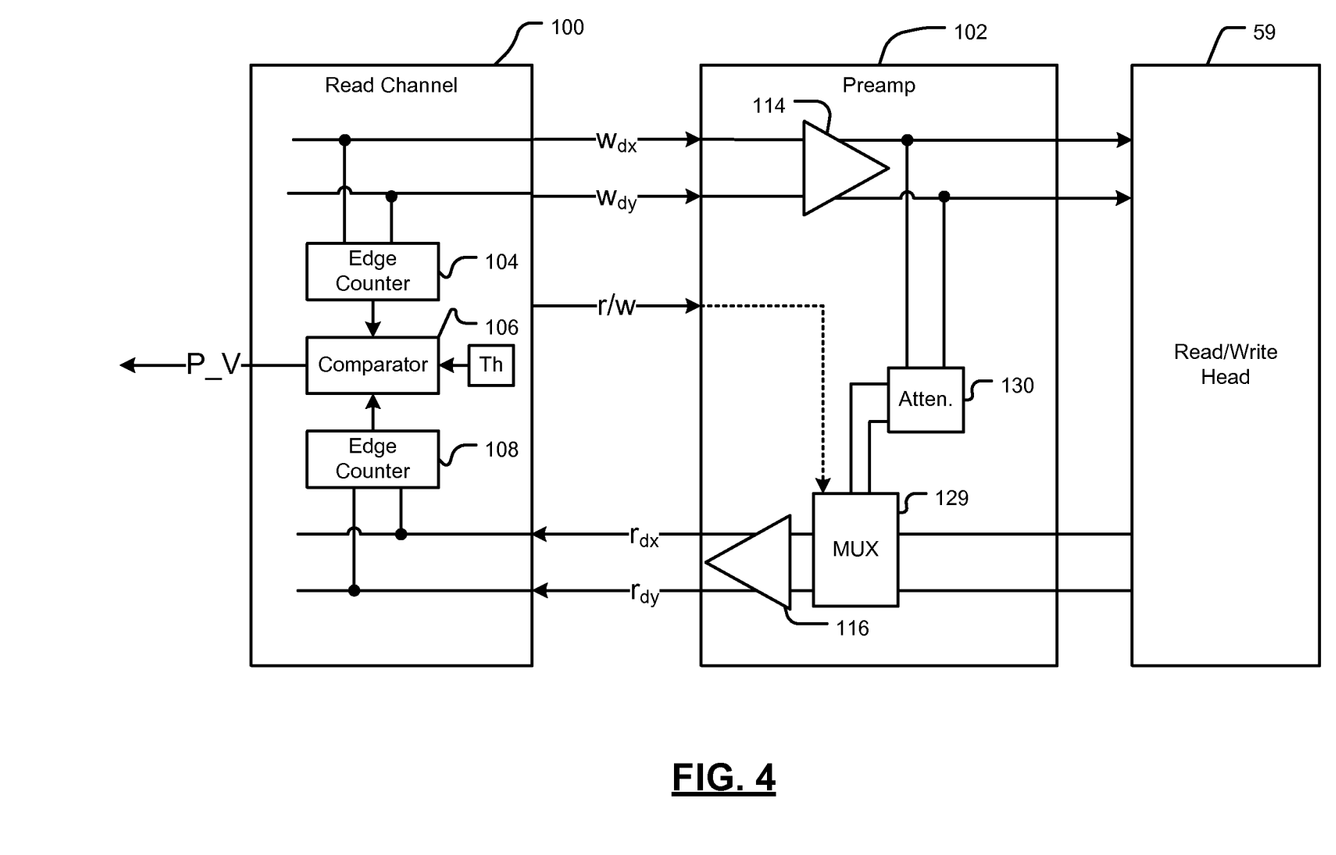
FIG. 4 is a functional block diagram of a second exemplary read channel circuit and preamp circuit with loopback according to the present invention.

Referring now to FIG. 4, a functional block diagram of a second exemplary read channel circuit 100 and preamp circuit 102 according to the present invention are shown. In FIG. 4, both the write amplifier 114 and the read amplifier 116 are tested at the same time. When the write enable signal is present, the output of the write amplifier 114 is connected by a multiplexer 129 through an optional attenuator circuit 130 to an input of the read amplifier 116. The attenuator circuit 130 attenuates the output of the write amplifier 114 if needed to prevent damage to the read amplifier 116. The multiplexer 129 disconnects the input of the read amplifier 116 from the read/write head 59.

Figure 5:
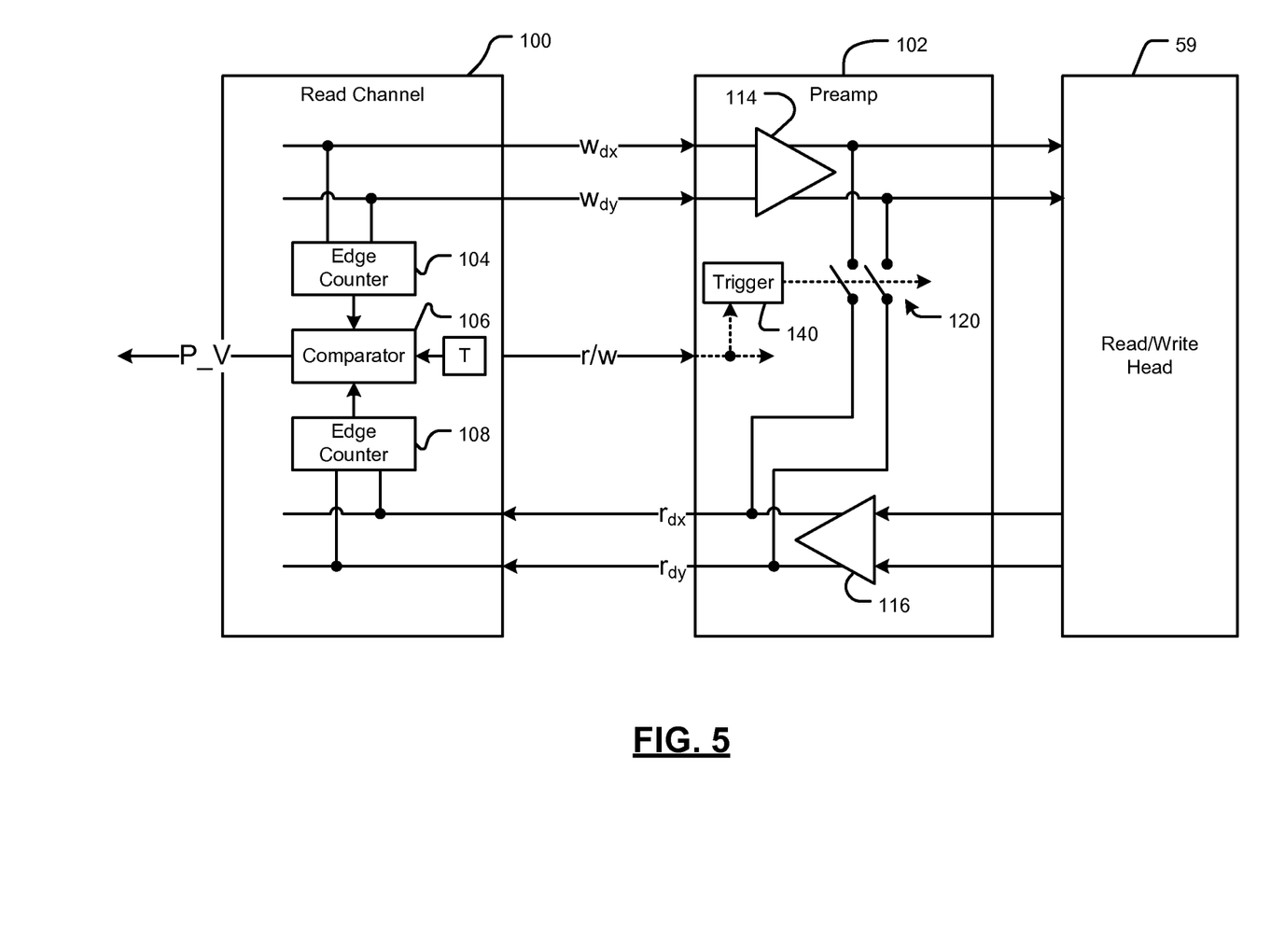
FIG. 5 is a functional block diagram of a third exemplary read channel circuit and preamp circuit with loopback according to the present invention.
Figure 6:
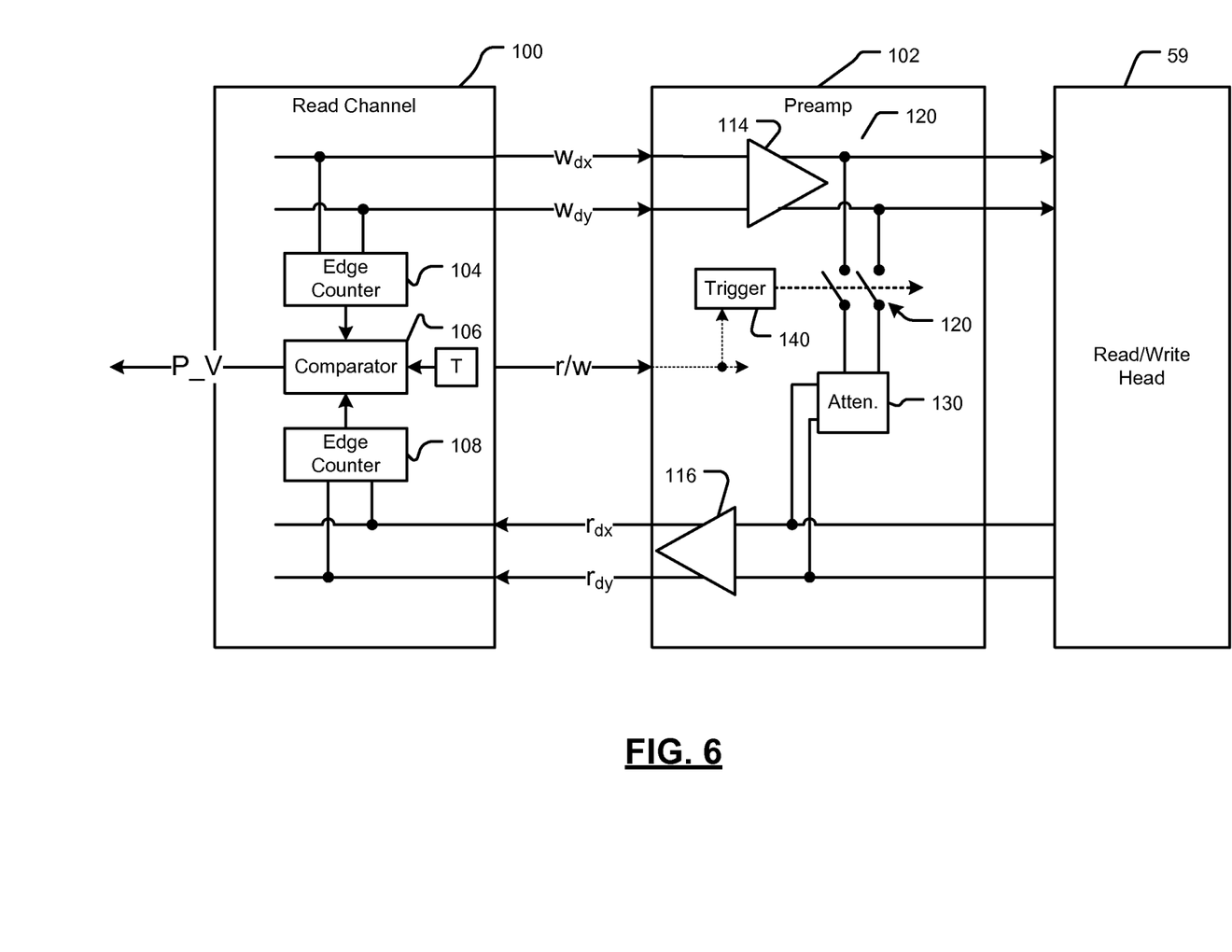
FIG. 6 is a functional block diagram of a fourth exemplary read channel circuit and preamp circuit with loopback according to the present invention.

Referring now to FIGS. 5 and 6, functional block diagrams of third and fourth exemplary read channel circuits 100 and preamp circuits 102 are shown. The read channel circuits 100 and preamp circuits 102 in FIGS. 5 and 6 are similar to those shown in FIGS. 3 and 4, respectively. However, instead of using the write enable signal to initiate the test, the preamp circuit 110 includes a trigger 140 that automatically triggers the loopback mode periodically when the write enable signal is present. For example, the trigger 140 can be triggered during startup when the write enable signal is present. The test enable signal that is generated by the trigger 140 remains high for a predetermined period during which the testing of the write amplifier 114 is performed. After the test is complete, the test enable signal goes low until the next startup. When the switch 120 is used in FIG. 5, the read amplifier 116 is optionally turned off during the loopback mode to reduce noise in the system due to signals from the read/write head 59. Turning off the read amplifier 116 may be accomplished by turning off or disconnecting a supply voltage, disconnecting the input of the read amplifier 116 from the read/write head and/or grounding the inputs of the read amplifier 116.

Figure 7:
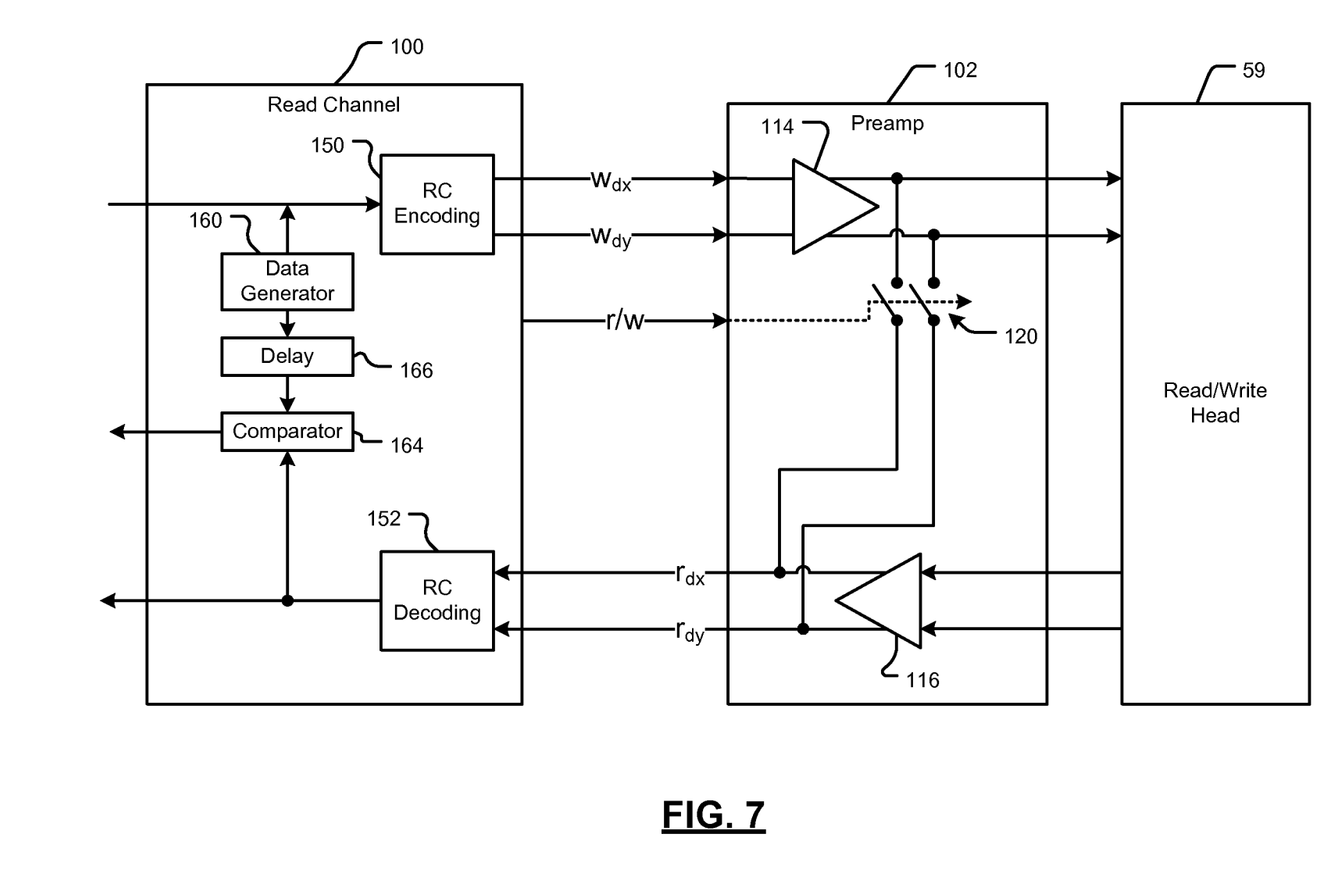
FIG. 7 is a functional block diagram of a read channel circuit that includes a data generator, a delay element and a comparator and preamp circuit with loopback according to the present invention.

Referring now to FIG. 7, the read channel (RC) circuit 100 includes a RC encoding circuit 150 in the write path and a RC decoding circuit 152 in the read path. The read channel circuit 100 includes a data generator 160 that generates a test symbol that is encoded and transmitted as a write signal to the preamp circuit 102. The write signal is amplified by the write amplifier 114 and looped back by the switch 120 during the loopback mode to the RC decoding circuit 152. The RC decoding circuit 152 decodes the write signal and outputs a received symbol to a comparator 164. As can be appreciated, a multiplexer may also be used.

The comparator 164 compares the received symbol to a delayed test signal. A delay element 166 can be used to delay the test symbol for an appropriate amount of time. As can be appreciated, a latch, a buffer or any other suitable device can alternatively be used to store the test symbol until the received symbol is received at the comparator 164. If the received symbol and test symbol match, the comparator 164 outputs a first state. If the symbols do not match, the comparator 164 outputs a second state. The first state corresponds to an operational preamplifier circuit. The second state corresponds to a non-operational preamplifier circuit. Faults and/or flags can optionally be generated when the comparator outputs the second state. When the switch 120 is used in FIG. 7, the read amplifier 116 is optionally turned off during the loopback mode to reduce noise in the system due to signals from the read/write head 59. Turning off the read amplifier 116 may be accomplished by turning off or disconnecting a supply voltage, disconnecting the input of the read amplifier 116 from the read/write head and/or grounding the inputs of the read amplifier 116.

Figure 8:
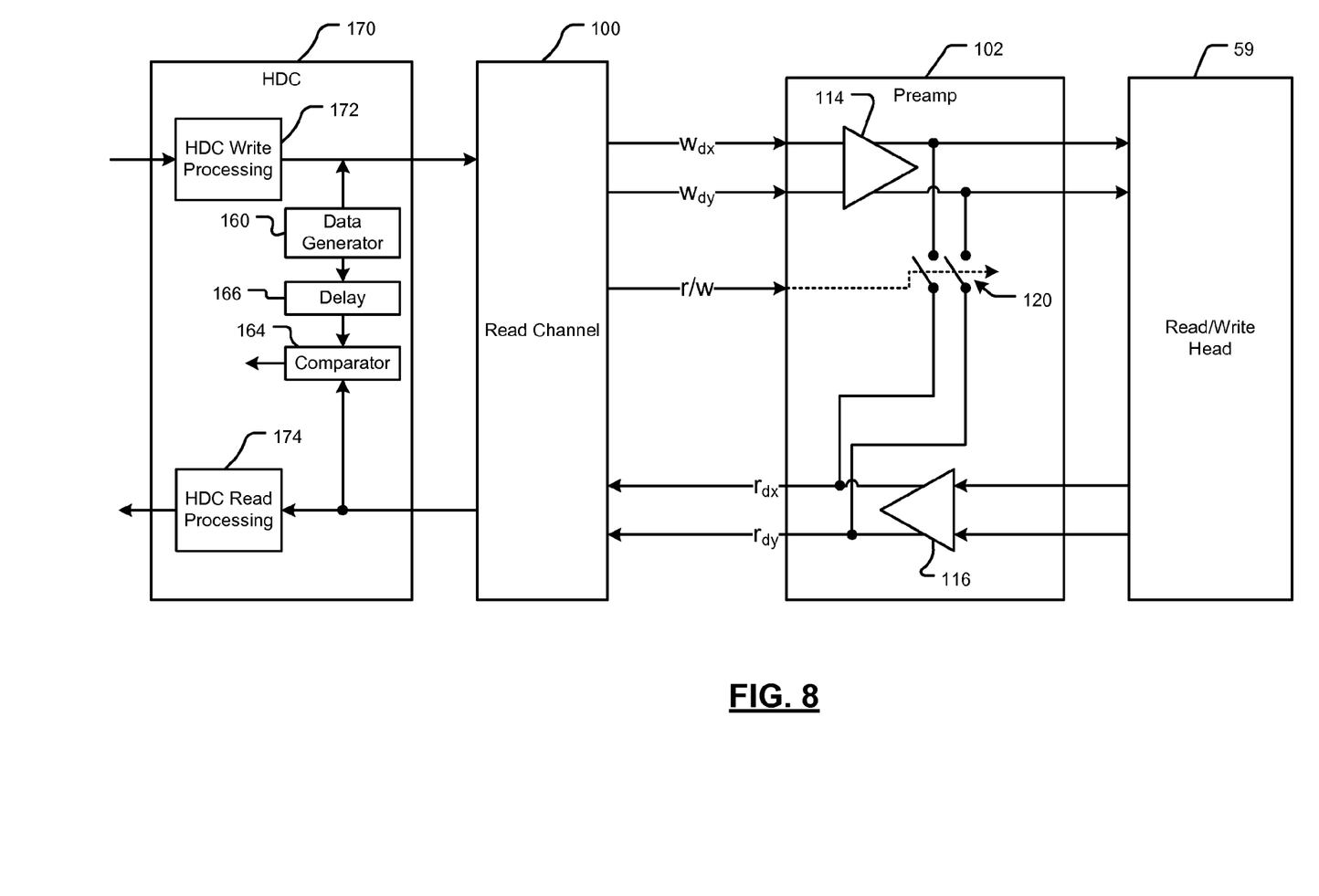
FIG. 8 is a functional block diagram of a hard drive controller that includes a data generator, a delay element and a comparator, a read channel circuit and preamp circuit with loopback according to the present invention.

Referring now to FIG. 8, a hard drive control (HDC) circuit 170 includes a HDC write processing circuit 172 in the write path and a HDC read processing circuit 174 in the read path. The data generator 160 generates a test symbol that is output by the HDC 170, encoded by the read channel circuit 100 and transmitted to the preamp circuit 102. The write signal is amplified by the write amplifier 114 and looped back by the switch 120 during the loopback mode to the read channel circuit 100 where decoding occurs. The received symbol is output to the comparator 164 in the HDC 170. As can be appreciated, a multiplexer can also be used.

The comparator 164 compares the received symbol to a delayed test signal. The delay element 166 can be used to delay the test symbol for an appropriate amount of time. As can be appreciated, a latch, a buffer or any other suitable device can alternatively be used to store the test symbol until the appropriate time. If the symbols match, the comparator 164 outputs a first state. If the symbols do not match, the comparator 164 outputs a second state. The first state corresponds to an operational preamplifier circuit. The second state corresponds to a non-operational preamplifier circuit. Faults and/or flags can optionally be generated when the comparator outputs the second state.

The data generator, delay, and comparator components can be located anywhere on the read/write path, integrated with any device located on the read/write path, located in a host, and/or located in any other suitable device. Skilled artisans will appreciate that the embodiments in FIGS. 5-8 may also be implemented using a multiplexer in a manner similar to FIGS. 3B and 4. When the switch 120 is used in FIGS. 3A, 5 and 7, the read amplifier 116 is optionally turned off during the loopback mode to reduce noise in the system due to signals from the read/write head 59. In one implementation, the signal that is used to initial the loopback mode can also be used to shut down the read amplifier 116. Alternately, the signal that is used to initiate the loopback mode can be used to trigger the additional switches and/or multiplexers that are used to turn off the read amplifier 116.

While the present invention has been described in conjunction with hard drives, skilled artisans will appreciate that the foregoing invention has application to any data storage device including hard disk drives, compact disk (CD) drives (write and/or read/write), digital video disk (DVD) drives (read and/or read/write), optical drives, and/or any other type of data storage device.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:
1. A system, comprising
a hard disk control circuit configured to generate a first symbol;
a read channel circuit configured to encode the first symbol to generate an encoded symbol; and
a preamplifier circuit configured to operate in a loopback mode to determine whether the preamplifier circuit is operating properly,
wherein, while operating in the loopback mode, the preamplifier circuit is configured to i) amplify the encoded symbol, and ii) transmit the amplified, encoded symbol back to the read channel circuit, and
wherein
the read channel circuit is configured to i) decode the amplified, encoded symbol to generate a second symbol, and ii) provide the second symbol to the hard disk control circuit, and
the hard disk control circuit is configured to i) perform a comparison between the first symbol and the second symbol, and ii) generate an indication of whether the preamplifier circuit is operating properly based on the comparison between the first symbol and the second symbol.

2. The system of claim 1, wherein the hard disk control circuit includes a data generator configured to i) generate the first symbol, and ii) provide the first symbol to a write path of the hard disk control circuit.

3. The system of claim 2, wherein the hard disk control circuit further comprises a delay element and a comparator, wherein:
the data generator is configured to provide the first symbol to the delay element;
the delay element is configured to i) delay the first symbol prior to providing the first symbol to the comparator; and
the comparator is configured to compare the first symbol, as delayed by the delay element with the second symbol.

4. The system of claim 3, wherein the delay element comprises a latch or a buffer.

5. The system of claim 1, wherein the indication of whether the preamplifier circuit is operating properly i) indicates that the preamplifier is operating properly if the first symbol matches the second symbol, and ii) indicates that the preamplifier is not operating properly if the first symbol does not match the second symbol.

6. The system of claim 1, wherein the preamplifier circuit includes a switch that is i) open when the preamplifier circuit is not operating in the loopback mode, and ii) closed when the preamplifier circuit is operating in the loopback mode.

7. The system of claim 6, wherein the read channel circuit is configured to generate a signal to selectively open and close the switch based on whether the preamplifier circuit is to operate in the loopback mode.

8. The system of claim 6, further comprising:
a write amplifier configured to amplify the encoded symbol; and
a read amplifier having an output connected to the read channel circuit.

9. The system of claim 8, wherein the write amplifier is configured to provide the encoded symbol to the output of the read amplifier when the switch is closed.

10. A method for determining whether a preamplifier circuit of a data storage device is operating properly by operating the preamplifier circuit in a loopback mode, wherein the data storage device further includes a hard disk control circuit and a read channel circuit, the method comprising
generating, via the hard disk circuit, a first symbol;
encoding, via the read channel circuit, the first symbol to generate an encoded symbol;

while operating the preamplifier circuit in the loopback mode, i) amplifying the encoded symbol via the preamplifier circuit, and ii) transmitting the amplified, encoded symbol back to the read channel circuit;

decoding, via the read channel circuit, the amplified, encoded symbol to generate a second symbol;

performing, via the hard disk circuit, a comparison between the first symbol and the second symbol; and generating, via the hard disk circuit, an indication of whether the preamplifier circuit is operating properly based on the comparison between the first symbol and the second symbol.

11. The method of claim 10, further comprising:
delaying the first symbol using a delay element prior to performing the comparison between the first symbol to the second symbol.

12. The method of claim 11, wherein the delay element comprises a latch or a buffer.

13. The method of claim 10, wherein the indication of whether the preamplifier circuit is operating properly i) indicates that the preamplifier is operating properly if the first symbol matches the second symbol, and ii) indicates that the preamplifier is not operating properly if the first symbol does not match the second symbol.

14. The method of claim 10, wherein the preamplifier circuit includes a switch that is i) open when the preamplifier circuit is not operating in the loopback mode, and ii) closed when the preamplifier circuit is operating in the loopback mode.

15. The method of claim 14, further comprising:
generating a signal to selectively open and close the switch based on whether the preamplifier circuit is to operate in the loopback mode.

16. The method of claim 14, wherein the preamplifier comprises:
a write amplifier configured to amplify the encoded symbol; and
a read amplifier having an output connected to the read channel circuit.

17. The method of claim 16, further comprising:
providing the encoded symbol from the write amplifier to the output of the read amplifier when the switch is closed.

* * * * *